United States Patent
Rangaswamy

(10) Patent No.: US 12,454,743 B1
(45) Date of Patent: Oct. 28, 2025

(54) THERMAL SPRAY POWDER FOR COATING ELECTRODES IN HYDROGEN PRODUCTION BY ALKALINE WATER ELECTROLYSIS

(71) Applicant: Subramaniam Rangaswamy, Rochester Hills, MI (US)

(72) Inventor: Subramaniam Rangaswamy, Rochester Hills, MI (US)

( * ) Notice: Subject to any disclaimer, the term of this patent is extended or adjusted under 35 U.S.C. 154(b) by 21 days.

(21) Appl. No.: 18/778,107

(22) Filed: Jul. 19, 2024

(51) Int. Cl.
- C22C 30/00 (2006.01)
- B22F 9/08 (2006.01)
- C25B 1/04 (2021.01)
- C25B 11/089 (2021.01)

(52) U.S. Cl.
CPC ............. *C22C 30/00* (2013.01); *B22F 9/08* (2013.01); *C25B 1/04* (2013.01); *C25B 11/089* (2021.01)

(58) Field of Classification Search
CPC .................................................. C22C 30/00
See application file for complete search history.

(56) References Cited

FOREIGN PATENT DOCUMENTS

| | | | | |
|---|---|---|---|---|
| CN | 114618525 A | * | 6/2022 | ............ B01J 25/02 |
| KR | 2020005828 A | * | 1/2020 | ............ C23C 4/08 |

OTHER PUBLICATIONS

Matthews, S. "Shrouded plasma spray of Ni—20Cr coatings utilizing internal shroud film cooling." Surface and Coatings Technology 249 (2014): 56-74. (Year: 2014).*
Black, J. Temple, and Ronald A. Kohser. DeGarmo's materials and processes in manufacturing. John Wiley & Sons, 2017. (Year: 2017).*
English machine translation of KR-2020005828-A (Year: 2020).*
Boulos, M.I., Fauchais, P.L., Heberlein, J.V.R. (2021). Gas and Particle Dynamics in Thermal Spray. In: Thermal Spray Fundamentals. Springer, Cham. (Year: 2021).*
English machine translation of CN-114618525-A (Year: 2022).*
Towler, Gavin Sinnott, Ray. (2022). Chemical Engineering Design—Principles, Practice and Economics of Plant and Process Design (3rd Edition)—18.4.1 Screening (Sieving). (pp. 759). Elsevier. (Year: 2022).*

* cited by examiner

*Primary Examiner* — Keith D. Hendricks
*Assistant Examiner* — Joshua S Carpenter

(57) ABSTRACT

A metal alloy powder composition consisting essentially of Nickel (32 to 42 wt %)-Aluminum (40-50 wt %)-Molybdenum (10-20 wt %)-Boron (0.1-2.0 wt %) in the particle size between 125 to 5 microns range and manufactured as an alloy by gas or water atomization process. This composition reduces the melting point of the alloy and minimizes the oxidation of aluminum in the alloy during thermal spray. This improves the integrity of the coating on electrodes in the alkaline water electrolysis application and the life of electrodes.

2 Claims, No Drawings

THERMAL SPRAY POWDER FOR COATING ELECTRODES IN HYDROGEN PRODUCTION BY ALKALINE WATER ELECTROLYSIS

CROSS-REFERENCE TO RELATED APPLICATIONS

None

BACKGROUND OF THE INVENTION

Field of the Invention

The present invention relates to chemical compositions, specifically designed for powders and coatings by thermal spray processes used in the production of cathodes in alkaline water electrolysis application.

Discussion of the State of the Art

Thermal Spray technology is a well-known industrial process for producing surface enhancement of a wide variety of substrates. This technology is extensively used for the repair and reclamation of worn industrial parts and/or to impart specific surface properties to the substrates. For example, thermally insulating ceramic coatings are applied on metallic superalloys in gas turbine engines to protect them from high temperature degradation. There are literally hundreds of materials that are used by the thermal spray process to enhance one or more properties such as hardness, wear resistance, corrosion resistance, frictional properties and others in numerous industrial applications in the aviation, power generation, automotive, semiconductor, paper mills, and several applications. Materials used in thermal spray include many metals, metallic alloys, oxide ceramics, carbides, plastics, and composites. In terms of the Spray Process, there are several spray devices within the Thermal Spray family based on the method of generating the heat to melt the coating material and/or to modify the velocity of impinging molten or semi molten particles to produce the coating. Plasma Spray Process is a popular and versatile method among the various thermal spray processes and uses a plasma arc to ionize the plasma forming gas. Temperatures in the plasma jet can be around 18000 deg C. Coating materials in the form of powders are injected in the plasma flame and are melted and sprayed onto the substrate as a coating. Other thermal spray devices use combustion of gases to produce a hot flame into which the coating material is injected. Depending on the quantity and flow of combustion gases, such spray devices can be adapted to higher particle velocities (such as HVOF processes) or lower velocities (such as Flame Spray Process). Commercially, there are many variations in the type of Plasma/Combustion/HVOF devices, all offering a range of temperatures and velocities suitable for melting the appropriate coating material.

Electrolysis of water or steam using renewable energy can produce carbon-free hydrogen on a large scale and enable clean energy transition. Among the electrolysers, alkaline water electrolyser (AWE) is one of the most established technologies. Raney™ Ni alloy (Nominally Nickel 39 wt %, Molybdenum 17 wt % and Aluminum 44 wt %) is most commonly used as a thermal spray coating catalyst in the electrode for AWE for hydrogen evolution reactions (HER) due to their reasonable catalytic activity in alkaline media and low cost. Coatings deposited on the cathodes are chemically activated in KOH and K—Na-Tartarate-Tetrahydrate solutions to create a porous surface that can be catalytically active to generate Hydrogen in the electrolyser. Different manufacturing routes have been used for producing Raney Ni coated electrodes including Electrodeposition, PVD, Air plasma spray (APS) and other thermomechanical methods. Vacuum Plasma Spray (VPS) has also been used to prepare AWE cathodes with Raney Nickel and the cells exhibited good performance. Despite these promising results, continuing pressure of reducing costs has motivated researchers to develop coated electrodes using Air Plasma Spraying (APS) process with modified and optimized spray parameters. New type of APS guns with axial injection of the powder particles and higher particle velocities have shown marginal improvement. With all current methods, however, there are concerns of excessive oxidation of metallic particles, and lower durability of electrodes due to electrochemical erosion and passivation. There are also concerns of poor interparticle bonding within the coating microstructure, lack of chemical homogeneity, Aluminum vaporization, Aluminum Oxidation and other factors that weaken the coated cathodes.

SUMMARY OF THE INVENTION

This invention focuses on solving and overcoming many of the above problems by developing new alloy compositions for thermal spraying a coating on the cathode. In particular, the object of the invention is to a) reduce the melting point of the metal alloy powder used, thereby increasing the deposition efficiency of the thermally spray coating b) improve the interparticle bonding within the sprayed coating c) improve the compositional homogeneity of the coating on the cathode, d) retain the maximum amount of Aluminum in the 'as sprayed' coating e) minimize the vaporization of the Aluminum content from the powder and f) minimize the oxidation of Aluminum from the alloy powder during thermal spray. The coating will also have superior interparticle bonding and increased strength after the chemical activation treatment. All of the above aspects of the invention will improve the integrity and durability of the coatings. These objectives are achieved by the addition of a small, controlled weight percentage of Boron as an alloying element in the metal alloy compositions used to prepare the coatings on the cathode substrates.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language).

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure.

BRIEF DESCRIPTION OF DRAWINGS

None.

DETAILED DESCRIPTION OF THE INVENTION

The invention provides metal alloy powders comprising the elements Nickel, Aluminum, Molybdenum, Boron, and trace impurities.

In one composition of the alloy powder, Nickel is in the range of 32-42 wt %, Aluminum in the range of 40-50 wt %, Molybdenum in the range of 10-20 wt % and Boron in the range of 0.1 to 2 wt %. The alloy powder composition may contain some trace impurities associated with the raw materials used to produce the alloy.

In a preferred composition of the alloy powder, Nickel is in the range of 35-40 wt %, Aluminum is the range of 41-47 wt %, Molybdenum in the range of 15-20 wt % and Boron in the range of 0.5 to 1 wt %. The alloy composition may contain some trace impurities associated with the raw materials used to produce the alloy.

The invented metal alloy powders have a Particle size distribution in the range between 125 to 5 microns. The invented metal alloy can also be made in the form of wire or rod.

The invented alloy powders are manufactured by atomizing the molten alloy by gas or water atomization methods.

The invented powder is fed into a suitable thermal spray device to produce a coating on the electrode substrates used in Alkaline Water electrolysis process.

The invention claimed is:

1. A metal alloy powder consisting essentially of 32 to 42 wt % nickel, 40 to 50 wt % aluminum, 10 to 20 wt % molybdenum, 0.1 to 2.0 wt % boron, and trace impurities.

2. A method of producing a porous surface of a coating on a cathode used in alkaline water electrolysis, the method comprising:
   a) manufacturing a metal alloy powder consisting essentially of 32 to 42 wt % nickel, 40 to 50 wt % aluminum, 10 to 20 wt % molybdenum, 0.1 to 2.0 wt % boron, and trace impurities, wherein the powder has a particle size in the range of 5 to 125 microns;
   b) thermally spraying the metal alloy powder onto the surface of the cathode using an air plasma spray process to form the coating; and
   c) chemically activating the coating in a solution of potassium hydroxide (KOH) and potassium sodium tartrate-tetrahydrate to create the porous surface of the coating on the cathode.

* * * * *